United States Patent
Shi et al.

(10) Patent No.: US 11,844,363 B2
(45) Date of Patent: *Dec. 19, 2023

(54) GLUTEN FREE NATIVE RAPESEED PROTEIN ISOLATE

(71) Applicant: DSM IP ASSETS B.V., Heerlen (NL)

(72) Inventors: Jing Shi, Echt (NL); Gerardus Johannes Franciscus Smolders, Echt (NL); Johannes Hendrikus Maria Willemsen, Echt (NL); Johannes Hendrikus Antonius Jeroen Vermunt, Echt (NL); Nienke Nina Hylkema, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 1067 days.

This patent is subject to a terminal disclaimer.

(21) Appl. No.: 16/062,797

(22) PCT Filed: Dec. 8, 2016

(86) PCT No.: PCT/EP2016/080234
§ 371 (c)(1),
(2) Date: Jun. 15, 2018

(87) PCT Pub. No.: WO2017/102535
PCT Pub. Date: Jun. 22, 2017

(65) Prior Publication Data
US 2020/0154732 A1    May 21, 2020

(30) Foreign Application Priority Data

Dec. 17, 2015 (EP) ..................................... 15200789
Jul. 7, 2016 (EP) ..................................... 16178343

(51) Int. Cl.
    *A23J 3/14*    (2006.01)
    *A23J 1/14*    (2006.01)
    *A23L 33/185*    (2016.01)
    *A23L 11/30*    (2016.01)

(52) U.S. Cl.
CPC ................. *A23J 1/142* (2013.01); *A23J 3/14* (2013.01); *A23L 11/32* (2016.08); *A23L 33/185* (2016.08)

(58) Field of Classification Search
CPC ...................................................... A23J 3/14
See application file for complete search history.

(56) References Cited

U.S. PATENT DOCUMENTS

| | | | |
|---|---|---|---|
| 2,861,061 A | 11/1958 | Borel et al. | |
| 2,861,062 A | 11/1958 | Borel et al. | |
| 5,844,086 A | 12/1998 | Murray | |
| 6,005,076 A | 12/1999 | Murray | |
| 7,687,088 B2 * | 3/2010 | Schweizer | A23J 3/14 424/725 |
| 7,959,968 B2 | 6/2011 | Schweizer et al. | |
| 8,623,445 B2 | 1/2014 | Tang | |
| 9,115,202 B2 | 8/2015 | Segall et al. | |
| 2003/0124241 A1 | 7/2003 | Westdal | |
| 2004/0039174 A1 | 2/2004 | Barker et al. | |
| 2005/0064086 A1 | 3/2005 | Hiron et al. | |
| 2007/0014914 A1 | 1/2007 | Borders et al. | |
| 2007/0098876 A1 | 5/2007 | Hiron et al. | |
| 2010/0041871 A1 | 2/2010 | Segall et al. | |
| 2010/0068370 A1 | 3/2010 | Segall et al. | |
| 2010/0086662 A1 | 4/2010 | Cox | |
| 2010/0136173 A1 | 6/2010 | Tang | |
| 2013/0005946 A1* | 1/2013 | Willardsen | C07K 1/36 530/377 |
| 2014/0256914 A1 | 9/2014 | Green et al. | |
| 2015/0073127 A1 | 3/2015 | Wnukowski et al. | |
| 2015/0272171 A1 | 10/2015 | Lamacchia et al. | |
| 2016/0031950 A1 | 2/2016 | Jaramillo et al. | |
| 2017/0027190 A1* | 2/2017 | During | B01D 15/362 |
| 2019/0150473 A1 | 5/2019 | Willemsen et al. | |
| 2019/0254303 A1 | 8/2019 | Shi et al. | |
| 2019/0307149 A1 | 10/2019 | Willemsen et al. | |
| 2019/0307160 A1 | 10/2019 | Shi et al. | |
| 2020/0154732 A1 | 5/2020 | Shi et al. | |
| 2021/0177005 A1 | 6/2021 | Hylkema et al. | |

FOREIGN PATENT DOCUMENTS

| | | |
|---|---|---|
| CA | 2954314 A1 | 10/2015 |
| DE | 102014005466 A1 | 10/2015 |
| EP | 1389921 A1 | 2/2004 |
| EP | 1715752 A1 | 11/2006 |
| EP | 1720415 A1 | 11/2006 |
| EP | 16178339 A | 7/2007 |
| EP | 16178343 A | 7/2007 |
| EP | 16178345 A | 7/2007 |
| EP | 16178347 A | 7/2007 |

(Continued)

OTHER PUBLICATIONS

Tzeng et al., "Production of Canola Protein Materials by Alkaline Extraction, Precipitation, and Membrane Processing", J. Food Science, vol. 55, No. 4, (1990), pp. 1147-1156. (Year: 1990).*
Akbari, Ali et al., "An integrated method of isolating napin and cruciferin from defatted canola meal", LWT-Food Science and Technology, Jun. 3, 2015, pp. 308-315, vol. 65, No. 1.
Karaca, Asli Can et al., "Emulsifying properties of canola and flaxseed protein isolates produced by isoelectric precipitation and salt extraction", Food Research International, Jul. 8, 2011, pp. 2991-2998, vol. 44, No. 9, Elsevier, Amsterdam, Netherlands.
International Search Report of International Patent Application No. PCT/EP2016/080234 dated Feb. 10, 2017.
"Guide to Calf Milk Replacers: Types, Use and Quality," Bovine Alliance on Management & Nutrition (BAMN Publication), 2008, 4 pages.

(Continued)

Primary Examiner — Elizabeth Gwartney
(74) Attorney, Agent, or Firm — MCBEE MOORE & VANIK IP, LLC

(57) ABSTRACT

A gluten free native rapeseed protein isolate comprising <10 ppm gliadin and processes to obtain the gluten free native rapeseed protein isolate comprising <10 ppm gliadin.

11 Claims, No Drawings

(56) References Cited

FOREIGN PATENT DOCUMENTS

| EP | 16178348 A | 7/2007 |
|---|---|---|
| EP | 2364602 A1 | 9/2011 |
| EP | 2736351 A1 | 6/2014 |
| EP | 16178340 A | 7/2016 |
| EP | 15200789 A | 12/2017 |
| EP | 3389391 A1 | 10/2018 |
| EP | 17166992 | 4/2019 |
| EP | 17166993 | 4/2019 |
| EP | 3481218 B1 | 5/2019 |
| WO | 03/034836 A1 | 5/2003 |
| WO | 03/043439 A1 | 5/2003 |
| WO | 2005/067729 A1 | 7/2005 |
| WO | 2005/077201 A1 | 8/2005 |
| WO | 2008/094434 A2 | 8/2008 |
| WO | 2010/003245 A1 | 1/2010 |
| WO | 2013/000066 A1 | 1/2013 |
| WO | 2015/114543 A2 | 8/2015 |
| WO | 2017/102535 A1 | 6/2017 |
| WO | 2018/007490 A1 | 1/2018 |
| WO | 2018/007491 A1 | 1/2018 |
| WO | 2018/007492 A1 | 1/2018 |
| WO | 2018/007493 A1 | 1/2018 |
| WO | 2018/007494 A1 | 1/2018 |
| WO | 2018/007508 A1 | 1/2018 |

OTHER PUBLICATIONS

Oral Presentation Themes 119-146 Abstracts, 14th International Rapeseed Congress, Jul. 2015, Canada, pp. 120-147.
Acknowledgement of receipt, submission No. 9560700, Application No. EP 17734756.4, EP App No. EP3481216, Mar. 3, 2021.
Acknowledgement of receipt, submission No. 9561629, Application No. EP 17734756.4, EP App No. EP3481216, Mar. 3, 2021.
Aluko, R.E. et al., "Limited enzymatic proteolysis increases the level of incorporation of canola proteins into mayonnaise," Innovated Food Science and Emerging Technologies, Jun. 1, 2005, vol. 6, pp. 195-202.
Anna-Stina Hoglund et al., "Distribution of Napin and Cruciferin in Developing Rape Seed Embryos 1", Plant Physiol., 1992, vol. 98, Dept. of Cell Reaearch, Uppsala Biomedical Center, Swedish University of Agricultural Sciences, Uppsala, Sweden pp. 509-515.
Annual Information Form for the year ended Mar. 31, 2012, Burcon Nutrascience Corporation, Jun. 25, 2012, pp. 1-74.
Campbell, Lisa et al., "Canola/Rapeseed Protein; Future Opportunities and Directions—Workshop Proceedings of IRC 2015," Plants, Apr. 13, 2016, vol. 5, No. 2, p. 17.
Commuinication of a Notice of Opposition in EP Application No. 3481216, mailed Mar. 10, 2021.
Communication of a Notice of Opposition in EP App. No. 17734757.2 mailed Feb. 4, 2021.
Communication of a Notice of Opposition in EP App. No. 3481216, mailed Mar. 4, 2021.
Consolidated List of Citations filed items with the Opposition to EP Application No. 3481216.
Declaration of Kevin Segall dated Dec. 23, 2020, 15 pages.
Declaration of Kevin Segall dated Jan. 27, 2021, 8 pages.
"Determination of Soluble Crude Protein May 23, 2013". Available online at http://norfor.info/files/pdf-dokumenter/pdf_lab/Analyses/NorFor_Soluble_Crude_Protein_2013-05-23.pdf on May 23, 2013, 4 pages.
Fukushima et al., "Denaturation of Soybean Proteins by Organic Solvents," Soybean Protein Denaturation, Mar. 1969, vol. 46, pp. 156-163.

Gerzhova, Alina et al., "Study of total dry matter and protein extraction from canola meal as affected by the pH, salt addition and use of zeta-potential/turbidimetry analysis to optimize the extraction conditions," Food Chemistry, vol. 201, 2016, pp. 243-252.
International Search Report received in international application No. PCT/EP2017/066871, dated Sep. 7, 2017, pages.
International Search Report received in international application No. PCT/EP2017/066872, dated Sep. 8, 2017, 5 pages.
International Search Report received in international application No. PCT/EP2017/066908, dated Sep. 11, 2017, 3 pages.
Segall, Kevin, Report about exerimentation conducted regarding the rapeseed protein isolates described in EP 3481216 (the opposed patent) and WO2013/000066, pp. 1-8.
Krishnamoorthy, Upoor and John Moran, "Rearing Young Ruminants on Milk Replacers and Starter Feeds," FAO Animal Production and Health Manual, 2011, 95 pages.
Letter accompanying subsequently filed items with the Opposition to EP Application No. 3481216, mailed Mar. 2021.
Morr et al., "A Collaborative Study to Develop a Standardized Food Protein Solubility Procedure," Journal of Food Science, vol. 50, pp. 1715-1718 (1985).
Nickerson, "Development of Formulated Canola Protein-based Ingredients for the Food Industry," Final Report: Apr. 2014, Project Code: Cup SCDC 2010-9, (Year: 2014), pp. 1-342.
Nickerson, Michael, "Protein Functionality Testing Manual," 2012, University of Saskatchewan, 16 pages.
Notice of Opposition to EP Application No. 3481216, mailed Mar. 3, 2021.
Opposition to European Patent Application No. 3481216, mailed Mar. 3, 2021.
Pudel et al., "Production and properties of rapeseed albumin," Lipid Technology, (2015), vol. 27, No. 5, pp. 112-114.
Rezig et al., "Pumpkin (*Cucurbita maxima*) Seed Proteins: Sequential Extraction Processing and Fraction Characterization," Journal of Agricultural and Food Chemistry, 2013, 61(32), pp. 7715-7721.
Screw Oil Press—gemco machine.com/Screw-Oil-Press.htm, retrieved Feb. 3, 2021,1 page.
Wanasundara, Janitha P.D et al., "Canola/rapeseed protein functionality and nutrition," OCL Jul. 1, 2016, p. D407, vol. 23, No. 4, 15 pages.
Kodagoda, et al., "Some Functional Properties of Rapeseed Protein Isolates and Concentrates," Can. Inst. Food Sci. Technol. J., (1973), vol. 6, No. 4, pp. 266-269.
International Search Report of International Patent Application No. PCT/EP2017/066869, dated Aug. 8, 2017.
J. Kroll, "Selected functional properties of detoxified eapeseed protein preparations effected by phytic acid," Die Nahrung—Food, (1991) vol. 35, No. 6, pp. 619-624.
Kroll et al., "Beeinflussung funktioneller Eigenschaften von Proteinen durch gekoppelte mechanolytische und chemische Modifizierung," Die Nahrung—Food, (1984), vol. 28, No. 4, pp. 389-396.
"The French have set off a trend of "detoxification" when they eat, and they can't even have gluten," European Times, published Nov. 13, 2015, 7 pages.
Wang, Xiao-hua, "Discussion on the oil making technology of imported rapeseed", Cereals & Oils, Issue 1, pp. 23-24, published on Dec. 31, 1999.
Rebuttal to Kevin Segall declaration submitted in EP opposition, dated Jun. 2, 2021, 1 page.
Decision rejecting opposition in oral proceedings of EP application No. 17735153.3, dated Mar. 9, 2022, 1 pages.
Decision rejecting opposition (Art. 101(2) EPC) of EP application No. 17735153.3, dated May 2, 2022, 36 pages.
Thompson, "Gluten-free oat production: Purity protocol versus mechanical or optical sorting: Does it matter to you?" Gluten Free Watchdog, 2022, <https: www.glutenfreewatchdog.org/news/category/gluten-free-oats>, Jun. 17, 2015, pp. 1-17.

* cited by examiner

GLUTEN FREE NATIVE RAPESEED PROTEIN ISOLATE

CROSS-REFERENCE TO RELATED APPLICATIONS

This application is a National Stage entry of International Application No. PCT/EP2016/080234, filed 8 Dec. 2016, which claims priority to European Patent Application No. 16178343.6, filed 7 Jul. 2016 and European Patent Application No. 15200789.4, filed 17 Dec. 2015.

BACKGROUND

Field of the Invention

The present invention relates to a gluten free native rapeseed protein isolate comprising <10 ppm gliadin and processes to obtain the gluten free native rapeseed protein isolate comprising <10 ppm gliadin.

Description of Related Art

Rapeseed is one of the most important oilseeds in the world (number 3 after soybean and palm oil). Rapeseed contains high amounts of oil (30 to 45%) and protein (20 to 30%). However anti-nutritional compounds such as glucosinolates, polyphenols and phytic acid are also present in rapeseed. Therefore rapeseed has received less attention for human nutrition due to the presence of such anti-nutritional compounds. However newer technologies can now be used to eliminate such compounds.

Processing of rapeseed seeds for oil production provides oilseed cake, also known as oilseed meal, as a by-product from cold-pressing and optionally extracting oil from the rapeseed seeds. The oilseed cake has a high-protein content which can be further extracted to produce rapeseed protein isolate.

Rapeseed protein isolate is now being suggested as an alternative to other proteins for human food use due to having a balanced amino acid profile on par with many animal proteins and superior to most vegetable proteins. Furthermore native rapeseed protein isolate has good potential functional properties such as emulsifying, foaming and gelling abilities. All these properties suggest that rapeseed seeds are a valuable source of high-quality protein isolate for utilization in the food processing industry, and can also be used as a good alternative to soybean derivatives and other plant and animal products.

The use of vegetable based protein in human nutrition is known, and for example WO 2008/094434 discloses the use of wheat protein isolates as an alternative to the use of egg yolk protein in compositions. However the use of wheat protein isolates may not be desirable for those with gluten allergies.

Gluten is a protein composite found in wheat and related grains, including barley and rye. Gluten is the composite of two storage proteins, gliadin and glutenin, in an equal amount, and is conjoined with starch in the endosperm of various grass-related grains. It is this protein composite that strengthens and binds dough in baking.

It has been found that a small percentage of the population have a gluten sensitivity where negative side effects occur with gluten consumption. For example non-coeliac gluten sensitivity (also often described as a wheat allergy) is a condition arising from a syndrome of gastrointestinal responses to gluten. The global prevalence of gluten-related disorders is estimated to be around 5% of the population.

In individuals with coeliac disease the consumption of gluten causes adverse health issues. Coeliac disease is an autoimmune disorder which affects the digestive process of the small intestine. In 2009, research showed between 0.5 and 1.0% of people in the US and UK are sensitive to gluten due to coeliac disease. Coeliac disease has no cure, but is manageable with a gluten-free diet.

Rapeseed (*Brassica Napus*), also known as rape, oilseed rape, *rapa*, rappi, rapeseed (and in the case of one particular group of cultivars, canola) is a bright yellow flowering member of the family Brassicaceae (mustard or cabbage family), (Wanasundara, 2011). Following pollination, rapeseed plants form an elongated pod with two chambers separated by a membrane with a single row of seeds within each chamber. The pods are contain 15 to 30 small, spherical seeds. The seeds of the *Brassica Napus* species are brown to black when mature. There are about 115,000 seeds per pound. Seeds are about 0.8 to 2.4 mm in diameter and although seed size may vary with variety and environmental effects the variation is minor when compared to the size and shape of an elongated wheat grain approximately 6 mm in length and 3 to 3.5 mm in width.

When rapeseed is grown in rotation with wheat, rye or barley it may result in the presence of gluten containing grains in the harvested rapeseed seeds. Furthermore rapeseed seeds may be transported or stored in vessels also used for wheat etc. Gluten is contained within a wheat or barley kernel. This may result in the presence of gluten in oil extracted from the rapeseed seeds and in any protein derived therefrom. The use of basic separation techniques to remove contaminants such as sticks and stones and bigger particles using normal refinery processes before extraction of oil should be sufficient to result in gluten free rapeseed oil. However for cold pressed rapeseed oil where the preparation is not as refined there may be residual gluten contaminants. Furthermore the issue of the presence of gluten in rapeseed protein isolate derived from cold pressed rapeseed cake is not sufficiently addressed as the process for preparing rapeseed protein isolate may result in concentrating any gluten present, thereby enhancing the effect.

WO 2014/147068 discloses the selective extraction of proteins over oil from oil seed meal, preferably from cold pressed oilseed meal, for the purpose of producing protein isolates composed of native proteins.

However mere screening and cleaning is not sufficient to remove all gluten containing contaminants as screening is usually used to remove larger stones and twigs. Sometimes rapeseed seeds are dehulled before pressing to extract oil, as the presence of the hulls in the remaining seed meal may lead to a reduction in the nutritional value of the oil. The dehulling process involves crushing the rapeseed seed between rollers with a pressure being applied in amount sufficient to crack the hull but not crush the kernel. Subsequently the hulls and kernel can be separated by screening. Dehulling of rapeseed seed does not remove wheat or barley contaminants as the dehulling process is likely to result in crushing any wheat or barley that is present making it even more difficult to separate out the gluten containing contaminants.

U.S. Pat. No. 4,253,946 discloses a cleaning attachment for grain augers where a series of semi-circular cut-out portions are provided on the underside of an auger tube which are covered with blanks when the cleaning device is not in use, but which are covered with semi-circular sieves when it is desired to clean grain or the like being augured.

The mesh of the screens is selected to suit the desired cleaning. A shroud encloses the sieves and an auxiliary auger is situated at the base of the shroud and is driven by the main auger drive. This auxiliary or return auger moves wheat seeds and the like which have passed through the sieve, to a discharge at the lower end of the shroud regardless of the angle of inclination of the main auger assembly.

US 2015/208689 discloses meat pet food products that allegedly lack wheat gluten and methods for making same are provided. The meat pet food products and methods for making same use (i) canola protein isolate (Isolexx™), (ii) a combination of flaxseed meal and canola protein isolate, or (iii) a combination of flaxseed meal and egg white to replace the wheat gluten without negatively affecting the product structure, appearance and palatability.

In order to ensure that rapeseed protein isolate is suitable for individuals who have coeliac disease it is essential to ensure that the rapeseed protein isolate gluten levels have been tested. It has been found that effective cleaning should be carried out before the crushing to extract oil from the oil seed and then the protein extraction from the resultant oil seed cake takes place. The problem of low levels of gluten had not been identified as there is an assumption that because rapeseed seed does not contain gluten it is inherently gluten free.

SUMMARY OF THE INVENTION

There is therefore a need to ensure that rapeseed protein isolate can be gluten free. By gluten free is meant that the protein isolate contains less than 20 ppm of gluten and more preferably less than 10 ppm of gluten. Gluten is usually measured by measuring the gliadin content.

Therefore according to the present invention there is provided a gluten free native rapeseed protein isolate comprising less than 10 ppm gliadin. According to the present invention there is also provided a process to prepare a gluten free native protein isolate comprising less than 10 ppm gliadin.

DETAILED DESCRIPTION OF A PREFERRED EMBODIMENT

Throughout the present specification and the accompanying claims, the words "comprise" and "include" and variations such as "comprises", "comprising", "includes" and "including" are to be interpreted inclusively. That is, these words are intended to convey the possible inclusion of other elements or integers not specifically recited, where the context allows.

The articles "a" and "an" are used herein to refer to one or to more than one (i.e. to one or at least one) of the grammatical object of the article. By way of example, "an element" may mean one element or more than one element.

According to the present invention there is provided a gluten free native rapeseed protein isolate comprising less than 10 ppm gliadin. More preferably the gluten free native rapeseed protein isolate comprises less than 5 ppm gliadin and most preferably no gliadin can be detected.

Protein Isolate

Proteins are available as hydrolysates, concentrates and isolates. Hydrolysates are proteins that have been partially broken down by exposing the protein to heat, acid or enzymes that break apart the bonds linking amino acids. This makes it taste bitter, but also allows it to be absorbed more rapidly during digestion than a native (non-hydrolysed) protein. Isolates are more pure than concentrates, meaning other non-protein components have been partially removed to "isolate" the protein.

The rapeseed protein isolate of the invention is native rapeseed protein isolate. By native is meant that the protein is not deliberately hydrolysed and that the protein is in its properly folded shape (in its native "conformation" or "structure").

Many protein concentrates are around 80% protein, which means that on a dry basis, 80% of the total weight is protein. Isolates are typically around 90% protein (dry basis). This is calculated using the Kjeldahl method. Typically, the non-protein content of the protein isolate includes non-protein compounds such as anti-nutritional substances, fat, fibre and other components.

Preferably the gluten free native rapeseed protein isolate of the invention has a protein content of at least 90 wt. % (calculated as Kjeldahl N×6.25) on a dry weight basis, more preferably at least 94 wt. %, most preferably at least 96 wt. % and especially at least 98 wt. %.

The predominant storage proteins found in rapeseed seeds are cruciferins and napins. Cruciferins are globulins and are the major storage protein in the seed. Cruciferin is composed of 6 subunits and has a total molecular weight of approximately 300 kDa. Napins are albumins and are a low molecular weight storage protein with a molecular weight of approximately 14 kDa. Napins are more easily solubilized and in for example EP 1715752 a process is disclosed to separate out the more soluble napin fraction, preferably to at least 85 wt. %. Napins are primarily proposed for use in applications where solubility is key.

Rapeseed proteins can be also divided into various fractions according to the corresponding sedimentation coefficient in Svedberg units (S). This coefficient indicates the speed of sedimentation of a macromolecule in a centrifugal field. For canola proteins, the main reported fractions are: 12S, 7S and 2S. Napin is a 2 S albumin, and cruciferin is a 12 S globulin. Furthermore, Schwenke, K. D. and K. J. Linow state that reversible dissociation of the 12S globulin from rapeseed (*Brassica napus* L.) depends on ionic strength. Die Nahrung=Food, 1982 (1)] state that the cruciferin complex is present as a 300 kDa 12S hexamer when exposed to higher ionic strength (p 0.5 mS/cm), and reversibly dissociates into 7S trimeric molecules of 150 kDa when exposed to low ionic strength conditions.

Preferably the gluten free native rapeseed protein isolate comprises 40 to 65 wt. % cruciferins and 35 to 60 wt. % napins.

Preferably the gluten free native rapeseed protein isolate has a cruciferin/napin (C/N) ratio in the range of from 0.9 to 1.3.

Preferably the gluten free native rapeseed protein isolate comprises at least 5%, more preferably at least 15% (on dry matter) 12S rapeseed protein where the presence of 12S is verified by Blue Native PAGE.

Preferably the gluten free native rapeseed protein isolate comprises less than 20% on dry matter of 7S rapeseed protein.

For use in human food consumption the gluten free native rapeseed protein isolate preferably comprises a low level of salt. This is measured by the conductivity. Preferably the conductivity of the gluten free native rapeseed protein isolate in a 2 wt. % aqueous solution is less than 9000 μS/cm over a pH range of 2 to 12. More preferably the conductivity of the gluten free native rapeseed protein isolate in a 2 wt. % aqueous solution is less than 4000 μS/cm over a pH range of 2.5 to 11.5. For comparison the conductivity of a 5 g/l NaCl aqueous solution is around 9400 μS/cm.

For use in human food consumption especially in nutritious beverages it is important for the rapeseed protein isolate to be soluble across a wide pH range in order to improve mouthfeel and reduce grittiness. Therefore preferably the gluten free native rapeseed protein isolate has a solubility of at least 88%, more preferably at least 90%, most preferably at least 94% and especially at least 96% when measured over a pH range from 4 to 10 at a temperature of 23+/−2° C. This is also known as the soluble solids index (SSI).

For use in human food consumption the removal of phytates, phenolics (or polyphenolics) and glucosinolates prevents unattractive flavour and coloration and decreased nutritional value of the protein isolate. At the same time this removal enhances the protein content of the protein isolate.

Preferably the gluten free native rapeseed protein isolate has a phytate level less than 0.4 wt. %, more preferably less than 0.3 wt. % and most preferably less than 0.15 wt. %.

Preferably the gluten free native rapeseed protein isolate has a phenolic content of less than 0.1 wt. %, preferably less than 0.05 wt. % on dry matter expressed as sinapic acid equivalents.

Preferably the gluten free native rapeseed protein isolate has a glucosinolate level less than 0.8 µmol/g and more preferably less than 0.5 µmol/g.

According to an embodiment of the present invention there is provided a gluten free native rapeseed protein isolate comprising <10 ppm gliadin; having a solubility of at least 88% when measured over a pH range from 4 to 10 at a temperature of 23+/−2° C.; having a conductivity in a 2 wt. % aqueous solution of less than 9000 µS/cm over a pH range of 2 to 12; and having a cruciferin/napin (C/N) ratio in the range of from 0.9 to 1.3.

In a further embodiment of the present invention there is provided a gluten free native rapeseed protein isolate comprising <10 ppm gliadin which comprises a protein content of at least 85 wt. %, preferably at least 90 wt. % and most preferably between 92 and 99 wt. % on dry matter; and a phenolic content of less than 0.1 wt. % on dry matter expressed as sinapic acid equivalents.

The gluten free native rapeseed protein isolate of the invention may be used in any human nutritional food applications including as a foaming agent to replace egg whites, as an emulsifying agent to replace for example egg yolk in mayonnaise and simply as a nutritional component providing an excellent amino acid profile.

Process

According to another embodiment of the invention there is provided a process to prepare a gluten free native rapeseed protein isolate according to the invention comprising at least the steps:
i) separating rapeseed seed from gluten containing contaminants;
ii) cold pressing the separated rapeseed seed to extract rapeseed oil resulting in a oilseed cake;
iii) extracting the oilseed cake with an aqueous solution to obtain an aqueous solution comprising rapeseed protein;
iv) separating out the aqueous solution comprising rapeseed protein from the extracted oilseed cake;
v) concentrating the aqueous solution comprising rapeseed protein;
vi) obtaining a rapeseed protein isolate comprising <10 ppm gliadin from the concentrated aqueous solution.

It is preferred that the conditions in the processes used to isolate the oil from the oilseed do not result in the substantial denaturation of the protein present in the oilseed or cake. An example is the avoidance of the use of solvents such as hexane during extraction. Another example of mild conditions is the cold-pressing of rapeseed. Maintaining the nativity and functionality of proteins is advantageous for the use of such proteins in a wide range of food applications where for example foaming or emulsification is desired. It was found that the rapeseed protein isolate produced by the process of the present invention is native (non-denatured) protein.

Preferably the rapeseed protein isolate is obtained in a process without a fractionating step for separating out cruciferins and napins.

Preferably the gluten free native rapeseed protein isolate is obtained in a process where the levels of napin and cruciferin are kept substantially constant within the claimed range (i.e. neither the napin (2S) nor cruciferin levels (12S) are deliberately increased by fractionating).

In a further embodiment of the invention there is provided a process to prepare a gluten free native rapeseed protein isolate comprising additional steps:
washing of the aqueous solution comprising rapeseed protein isolate;
drying of the concentrate to obtain the rapeseed protein isolate.

Separating

To remove any gluten containing contaminants from rapeseed seeds a number of separation techniques may be carried out including sieving, image analysis, gravitational methods and spinning.

In one embodiment to remove any gluten containing contaminants the rapeseed seeds are sieved after harvesting. A number of sieving processes and machines are known for the general cleaning of seeds. For example an air-screen machine comprising at least two screens may be used, where the first screen for example has circular perforations of size 9 mm, allowing the passing through of seeds, retaining only the larger materials (for example green grains, pods, stems, stalks and culture debris). The material comprising seeds and other smaller impurities fall on another screen with perforations smaller than the seed size (width and thickness). The material smaller than the seed falls through the second screen and it is collected for disposal. Simultaneously aspiration may be employed to remove materials with a lighter weight than the seeds. Commercially available cleaning machines include the Cimbria DELTA Super 101 range from Cimbria Manufacturing A/S. These focus on the separation of lighter particles and heavier particles (such as stones etc.).

In order to remove the gluten containing contaminants from rapeseed seed preferably a round-hole sieve with holes in the range of from 2 mm to 2.8 mm is employed. This allows the rapeseed seeds to fall through and therefore separates out the larger gluten containing contaminants for disposal.

Cold-Pressing

Methods for cold-pressing rapeseed seeds to make oilseed cake are well known in the art. To preserve the native state of the proteins the oilseed cake used for the protein extraction preferably originates from non-hexane treated oilseed.

Extraction

To extract the protein fraction from the oilseed cake, several extraction techniques may be employed. These include extraction with water or alkali, NaCl and sodium hexametaphosphate solutions. An alkaline extraction process leads to highest yields, but has the risk of darkening of the product and a negative impact on taste or smell.

The extraction of the protein from the oilseed cake is carried out in any convenient manner consistent with effecting a continuous extraction of protein from the oilseed cake, such as passing the mixture of oilseed cake and food grade aqueous solution through a conduit having a length and at a flow rate for a residence time sufficient to effect the desired extraction.

Alternatively, the extraction may be effected in a stirred tank into which the mixture of oilseed cake and aqueous solution is continuously or discontinuously fed and from which the aqueous protein solution is continuously or discontinuously removed. In addition, the procedure may be effected in a semi-continuous manner equivalent to continuous wherein a mixture of oilseed cake aqueous solution is fed into a first stirred vessel in which the extraction is effected to form the aqueous protein solution while aqueous protein solution is continuously fed from a second stirred vessel to the residual oilseed cake separation step described below. When the aqueous protein solution has been formed in the first vessel and the second vessel has been depleted of aqueous protein solution, the first vessel then becomes the first vessel and vice versa.

Preferably extraction of proteins from rapeseed oil cake is carried out with an aqueous extraction liquid at a ratio in the range of from 0.5:15 to 2:8. Preferably the aqueous extraction liquid is an aqueous salt solution. More preferably the aqueous salt solution comprises NaCl. Most preferably the aqueous salt solution comprises 0.1 to 5% and especially 1 to 5% NaCl (w/w).

Preferably the extraction time is in the range of from 5 to 60 minutes, more preferably in the range from 30 to 60 minutes.

Preferably the extraction temperature is carried at a temperature between 4 to 75° C., more preferably 20 to 75° C., most preferably 40 to 75° C. and especially 45 to 65° C.

The aqueous phase or solution resulting from the extraction step may be separated from the residual oilseed cake in any convenient manner, such as by employing filtration and/or centrifugation to remove residual cake.

The separated residual oilseed cake may be dried and used for example for animal feed.

The protein rich solution is hereafter referred to as extract. Alternative methods to prepare the rapeseed protein isolate from the extract, include but are not limited to A) concentration of the extract or B) by precipitation of the protein isolate out of the extract.

A) Concentration of the Gluten Free Native Protein Isolate Extract

Preferably the extract containing the rapeseed protein isolate is decreamed using centrifugation. Filtration may also be used. Preferably the fat level is reduced by at least 30%, more preferably at least 50% (w/v). The extract may be further processed to clarify the material and remove non-protein substances. Preferably soluble carbohydrates, glucosinolates or their derivatives, phytates or polyphenolic (or phenolic) compounds or a combination of one or more of these compounds are removed from the aqueous solution or concentrated aqueous solution.

The aqueous phase comprising the rapeseed protein isolate may then be concentrated and washed. The concentration step may be effected in any convenient manner consistent with a (semi) continuous or batch (discontinuous) operation, such as by employing any convenient selective membrane technique, such as ultrafiltration (UF), to permit the desired degree of concentration of the aqueous protein solution. Preferably before, after or during the concentration step, diafiltration may be performed. This diafiltration takes place after the extraction step and before the addition of the water-soluble solvent. UF may be used for diafiltration. So UF may be used for diafiltration as well as concentration, or UF may be used for diafiltration and the concentration step is done separately. By using UF for the diafiltration, most of the soluble carbohydrates and ANF's (anti-nutritional factors like glucosinolates and their derivatives, phytates and most of the polyphenolic compounds) present in the aqueous extract can also be advantageously removed.

Advantageously in the process of the invention after the extraction step the aqueous solution or concentrated aqueous solution is preferably diafiltrated by using UF (ultrafiltration).

Preferably washing of the concentrate is carried out by diafiltration water using approximately 5 to 15 times the volume of the concentrate. For example if the initial volume is 300 L, the liquid is concentrated to about 50 L (6× concentration) and is then washed with 500 L (10×) of water.

The concentrate comprising the gluten free native rapeseed protein isolate may be dried in any convenient manner, such as by spray drying (single or multistage), fluidized bed drying, freeze drying or vacuum drum drying, to a dry form.

B) Precipitation of the Gluten Free Native Protein Isolate from the Extract

In an alternative embodiment of the present invention there is provided a process to prepare a gluten free rapeseed protein isolate where the aqueous extract is concentrated to an aqueous solution comprising 5 to 30 wt. % protein, preferably 10 to 30 wt. % protein and then adding a water-soluble solvent to the concentrated aqueous solution to obtain a protein precipitate; followed by separating the protein precipitate from the liquid fraction to obtain a rapeseed protein isolate.

The water soluble solvent is preferably selected from the group comprising methanol, ethanol, acetone or mixtures thereof and is more preferably ethanol. Preferably the liquid fraction after separation comprises any polyphenolic compounds.

Preferably the process may further comprise one or a combination of the additional or subsequent steps of washing the protein precipitate; and drying the protein precipitate.

One of the methods to remove phenolic compounds from precipitated protein formulations is to wash them out with water-soluble solvents like methanol, acetone, ethanol etc. Different approaches are possible, for example pre-processing, such as applying a solvent leaching step prior to extraction of the proteins or post-processing, such as washing of the protein isolates after extraction or isolation.

In the step wherein water-soluble solvent such as ethanol is added, preferably a water-soluble solvent of at least 90 vol. % of solvent is used, preferably at least 92 vol. % of solvent. So in the step wherein ethanol is added, preferably at least 90 vol. % ethanol is used, preferably at least 92 vol. %. However a concentration of about 70 vol. % ethanol is sufficient to precipitate the protein.

Separation of the protein precipitate and the liquid fraction can be done in any suitable separator such as by employing filtration and/or centrifugation. The liquid fraction may contain anti-nutritional compounds (such as phytates, phenolics and glucosinolates) and sugars. If a diafiltration step is used as described above, only minor fractions of these compounds may be present.

The precipitate can be washed for example with a water/water-soluble solvent such as ethanol solution containing less than 70 vol. % water-soluble solvent, preferably comprising 50 to 70 vol. % water-soluble solvent, more preferably 50 to 70 vol. % ethanol and most preferably 50 to 60 vol. % ethanol.

Methods and Materials

Protein Content

Protein content was determined by the Kjeldahl method according to AOAC Official Method 991.20 Nitrogen (Total) in Milk. A conversion factor of 6.25 was used to determine the amount of protein (% (w/w)).

Conductivity

The conductivity of native rapeseed protein isolate in a 2 wt. % aqueous solution was measured using a conductivity meter: Hach sensION+EC71.

Solubility Test:

Sufficient protein powder to supply 0.8 g of protein was weighed into a beaker. A small amount of demineralized water was added to the powder and the mixture was stirred until a smooth paste was formed. Additional demineralized water was then added to make a total weight of 40 g (yielding a 2% w/w protein dispersion). The dispersion was slowly stirred for at least 30 min using a magnetic stirrer. Afterwards the pH was determined and adjusted to the desired level (2, 3, 4, etc.) with NaOH or HCl. The pH of the dispersion was measured and corrected periodically during 60 minutes stirring. After 60 minutes of stirring, an aliquot of the protein dispersion was reserved for protein content determination (Kjeldahl analysis). Another portion of the sample was centrifuged at 20,000 G for 2 min. The supernatant and pellet were separated after centrifugation. The protein content of the supernatant was also determined by Kjeldahl analysis.

Protein solubility (%)=(protein in supernatant/protein in total dispersion)×100

MW Determination by Blue Native PAGE.

In the case of Native PAGE the protein charge has an impact on the electrophoretic mobility. In the case of Blue native PAGE (and to the contrary of clear native PAGE), the Coomassie Brilliant Blue dye provides the necessary charges to the protein complexes for the electrophoretic separation.

The proteins were dissolved in 500 mM NaCl. As high salt concentrations are incompatible with electrophoretic separation, the sample was diluted 10 fold with water (final salt concentration: 50 mM). Coomassie® G-250 (SimplyBlue™, ThermoFischer Scientific) was used and gels were scanned with an ExQuest™ Spot Cutter (BioRad). Resultant bands after carrying out Blue Native PAGE were observed.

It would be expected that bands around 14 kDa indicate 2S, around 150 kDa indicate 7S and 300 kDa indicate around 12S proteins.

Cruciferin/Napin (C/N) Ratio

The C/N ratio was determined by Size Exclusion Chromatography (SEC) analysis: Samples were dissolved in a 500 mM NaCl saline solution and analyzed by HP-SEC using the same solution as the mobile phase. Detection was done by measuring UV absorbance at 280 nm. The relative contribution of cruciferin and napin (wt. %) was calculated as the ratio of the peak area of each protein with respect to the sum of both peak areas.

Phytate Level

Phytate level was measured at Eurofins using method QD495, based on Ellis et al, Analytical Biochemistry Vol. 77:536-539 (1977).

Gluten Content:

The Codex *Alimentarius* (Alinorm 08/31/26) has two categories for labelling of food according to the gluten content:

1) Food products which contain less than 20 ppm of gluten can be labelled as "gluten free" and are considered as suitable for those suffering from coeliac disease.
2) Food products labelled as "very low gluten" can have a gluten content above 20 and up to 100 ppm and are considered as suitable for those who are sensitive to gluten.

RIDASCREEN® Gliadin is a sandwich enzyme immunoassay for the quantitative analysis of contaminations by prolamins from wheat (gliadin), rye (secalin), and barley (hordein) in raw products like flours (and spices as well as in processed food like noodles, ready-to-serve meals, bakery products, sausages, beverages and ice cream. Gliadin levels were determined from extraction samples using a kit from r-Biopharm: sandwich ELISA RIDASCREEN® Gliadin according to the manufacturer's instructions.

UPEX (Universal Prolamin and Glutelin Extractant Solution) Extraction Method.

1) A 0.25 g portion of ground sample of material was weighed and transferred to a 10 $cm^3$ polypropylene tube.

(2) A 2.5 $cm^3$ aliquot of the UPEX solution (5 mM TCEP, 2% N-lauroylsarcosine in PBS, pH 7) was added to the tube containing the portion. To preventing inactivation of the reducing agent, the UPEX solution was prepared before use.

(3) The tubes were closed tightly and the caps were covered with film to avoid evaporation.

(4) The contents of the tubes were mixed thoroughly by vortexing for 5 to 10 s and the tubes were placed in a rack.

(5) The tubes were incubated in a water bath at 50° C. for 40 min.

(6) The tubes were cooled for 5 min at room temperature.

(7) A 7.5 $cm^3$ aliquot of 80% ethanol/water (v/v) was added and the samples were thoroughly dispersed by vortexing for 10 to 60 s (until total dispersion of the sample was achieved) and then incubated for 1 h at room temperature in a rotary (head-overhead) shaker at 45 turns/min.

(8) The tubes were centrifuged in a bench-top centrifuge for 10 min at 2500 g at room temperature.

Test for Gliadin Ppm:

The sandwich ELISA from R-Biopharm (cat no R7001, lot 14434) was used according to the manufacturer's instructions to determine the gliadin ppm in the extracts.

EXAMPLES

Example 1: Rapeseed Seeds

This example demonstates the presence of gluten cross contamination in harvested rapeseed and how it can be removed.

Sample 1 and 2 comprised hulled rapeseed seeds available from Rickermann (1.5 to 2.0 mm in diameter). The seeds were sieved twice to separate gluten containing contaminants. The sieves used were Retsch sieves with different diameters. The first sieve had holes with a diameter of 2.5 mm that could capture gluten containing contaminants like wheat grains other larger contanimants such as twigs and the second sieve had holes with a diameter of 1.4 mm to capture the rapeseed seeds and allow for example dust to pass by. The sieved rapeseed was washed first in water and then in ethanol to remove any dust and then dried.

Samples 3 and 4 comprised the gluten containing contaminants separated out from the rapeseed seeds in the preparation of samples 1 and 2.

Samples 1 to 4 were ground using a coffeemill (grinder) from IKA. The samples were tested for their gliadin content and the results are shown in Table 1 below. Both proteins gliadin and glutenin are present in gluten in equal amounts but only gliadin can be easily determined. Therefore in order to determine the gluten content the gliadin content is doubled.

TABLE 1

| Sample | Gliadin ppm (mg/Kg) | SD | RSD % | Gluten ppm (mg/Kg) |
|---|---|---|---|---|
| 1 | <5 | n/a | n/a | <10 |
| 2 | <5 | n/a | n/a | <10 |
| 3 | 274 | 173.9 | 63.5 | 548 |
| 4 | 561 | 149.3 | 26.6 | 1122 |

It can be seen from Table 1 above that commercial rapeseed contains gliadin and therefore gluten which can be removed by effective sieving. The gluten is from cross contamination during harvest and/or transport and storage. SD and RSD refer to standard deviation and relative standard deviation.

Example 2: Rapeseed Protein Isolate

This example shows the gluten level difference between rapeseed protein isolates which were derived from sieved and non-sieved rapeseed seed using the process described below.

The native rapeseed protein isolate was produced from cold-pressed (not hexane extracted) rapeseed seeds resulting in rapeseed oilseed cake having an oil content of less than 15% on dry matter basis, cleaned and processed below 75° C.

The rapeseed oilseed cake was mixed with an aqueous salt solution (1 to 5% NaCl), at a temperature between 40 to 75° C. The cake to water ratio was in the range of from 1:5 to 1:20. After about 30 minutes to 1 hour the protein rich solution (extract) was separated from the insoluble material. The extract was further processed to clarify the material and remove non-protein substances. The residual fat and formed precipitates were removed via a liquid/liquid separation step. The extract was then concentrated and washed in an ultrafiltration/diafiltration (UF/DF) step. Finally the washed concentrate was dried in a spray drier with an inlet temperature in the range of from 150 to 200° C. and an outlet temperature in the range of from 50 to 100° C. resulting in native rapeseed protein isolate.

Samples 1 to 3 are different batches of native rapeseed protein isolate derived from oilseed cake obtained from rapeseed seeds from which gluten containing contaminants had not been separated.

Sample 4 to 6 are different batches of gluten free native rapeseed protein isolate derived from oilseed cake obtained from rapeseed seeds from which gluten containing contaminants had been separated by sieving as described in Example 1.

The samples were tested for their gliadin content and the results are shown in Table 2 below.

TABLE 2

| Sample | Gliadin ppm (mg/Kg) | SD | RSD % | Gluten ppm (mg/Kg) |
|---|---|---|---|---|
| 1 | 12.3 | 0.9 | 7.5 | 24.6 |
| 2 | 42.0 | 2.5 | 6.0 | 84.0 |
| 3 | 26.6 | 2.3 | 8.5 | 53.3 |
| 4 | 4.41 | 0.48 | 10.9 | 8.81 |
| 5 | 4.74 | 0.52 | 10.9 | 9.48 |
| 6 | 2.0 | 0.45 | 22.6 | 4.0 |

It can be seen from Table 2 above that the gluten level is much lower in the rapeseed protein isolate derived from rapeseed seeds where gluten containing contaminants have been separated out.

Example 3: Comparative Rapeseed Protein Isolates

Table 3 shows the gluten level difference between different rapeseed oilseed cakes where the rapeseed protein isolate samples are prepared using the process as described in Example 2.

Sample 1: Rapeseed protein isolate prepared from rapeseed oilseed cake available from Teutoburger obtained from dehulled rapeseed seed.

Sample 2: Rapeseed protein isolate prepared from rapeseed oilseed cake available from Gecko obtained from non-dehulled rapeseed seed.

Sample 3: Rapeseed protein isolate prepared from rapeseed oilseed cake available from Rickermann obtained from non-dehulled rapeseed seed that was sieved before crushing as also described in Example 2, sample 4.

TABLE 3

| Sample | Gliadin ppm (mg/Kg) | SD | RSD % | Gluten ppm (mg/Kg) |
|---|---|---|---|---|
| 1 | 41.0 | 4 | 9.7 | 82.0 |
| 2 | 24.5 | 5.25 | 22.25 | 49.0 |
| 3 | 4.41 | 0.48 | 10.9 | 8.81 |

It can be seen from Table 3 above that the gliadin and therefore gluten level is much lower in the rapeseed protein isolate derived from rapeseed seeds where gluten containing contaminants have been separated out. Furthermore it can be seen that dehulling does not inherently reduce the gluten levels.

Example 4: Comparative Rapeseed Protein Isolates

Table 4 shows the gluten level differences between two different rapeseed protein isolate samples. Each sample was tested twice (A and B).

Sample 1 Advantexx 80 (available from Bioexx) # BIO-CENA120248.

Sample 2 Isolexx (available from Teutexx/Bioexx) # BIOEXX120120214.

Teutexx Data: protein >90%, solubility less than 60% at pH 7; phytic acid <1.25% and phenolics <0.7%.

TABLE 4

| Sample | Gliadin ppm (mg/Kg) | SD | RSD % | Gluten ppm (mg/Kg) |
|---|---|---|---|---|
| 1 A | 48.5 | 24.9 | 51.4 | 97.0 |
| 1 B | 36.9 | 22.7 | 61.5 | 73.8 |
| 2 A | 66.8 | 4.2 | 6.3 | 133.6 |
| 2 B | 71.4 | 6.6 | 9.3 | 142.8 |

It can be seen from the examples above that these rapeseed protein isolates have higher gliadin levels and therefore are not gluten free.

Example 5

Rapeseed protein isolate samples were prepared using the process as described in Example 2 and the solubilities measured as shown in Table 5 below. The resultant rapeseed protein isolates had a solubility of at least 88% over a pH range from 4 to 10 at a temperature of 23+/−2° C.

TABLE 5

|  | pH | | | | | | |
| --- | --- | --- | --- | --- | --- | --- | --- |
|  | 4 | 5 | 6 | 7 | 8 | 9 | 10 |
| Solubility Sample 1 | 96 | 89 | 95 | 95 | 97 | 97 | 98 |
| Solubility sample 2 | 97.5 | 94.3 | 93.9 | 97 | 93 | 94 | 99.8 |

Example 6

A rapeseed protein isolate was prepared using the process as described in Example 2 and the conductivity of the native rapeseed protein isolate in a 2 wt. % aqueous solution was less than 4000 μS/cm over a pH range of 2.5 to 11.5.

Example 7

Rapeseed protein isolate samples were prepared using the process as described in Example 2 and the C/N ratio was determined and found to be 1.0, 1.3 and 0.9 respectively. Blue Native PAGE: A main band was observed roughly around 300 kDa, between the 242 and 480 kDa MW markers. Some staining was visible as a smear as lower MW (150 kDa and below). No clear band was observed at 150 kDa. Based on these results, the rapeseed protein isolate samples contained the 12S form of cruciferin.

The native rapeseed protein isolates comprised in the range of from 40 to 65 wt. % cruciferins and 35 to 60 wt. % napins.

Example 8

A rapeseed protein isolate was prepared using the process as described in Example 2 and contained less than 0.26 wt. % phytate, and had a phenolic content of 0.04 wt. % on dry matter expressed as sinapic acid equivalents.

The invention claimed is:

1. A gluten free native rapeseed protein isolate comprising less than 10 ppm gliadin, wherein the native rapeseed protein isolate comprises at least 15% on dry matter of 12S rapeseed protein and less than 20% on dry matter of 7S rapeseed protein where the presence of 12S is verified by Blue Native PAGE, and wherein the native protein isolate has a solubility of at least 88% when measured over a pH range from 4 to 10 at a temperature of 23+/−2° C.

2. A gluten free native rapeseed protein isolate according to claim 1 comprising less than 5 ppm gliadin.

3. A gluten free native rapeseed protein isolate according to claim 1 with a protein content of at least 90 wt. % calculated as Kjeldahl (N×6.25) on a dry weight basis.

4. A gluten free native rapeseed protein isolate according to claim 1 with a cruciferin/napin (C/N) ratio in the range of from 0.9 to 1.3.

5. A gluten free native rapeseed protein isolate according to claim 1 with a conductivity in a 2 wt. % aqueous solution of less than 9000 μS/cm over a pH range of 2 to 12.

6. A gluten free native rapeseed protein isolate according to claim 1 with a phytate level less than 0.4 wt. %.

7. A gluten free native rapeseed protein isolate according to claim 1 having a phenolic content of less than 0.1 wt. % on dry matter expressed as sinapic acid equivalents.

8. A gluten free native rapeseed protein isolate according to claim 1 having a conductivity in a 2 wt. % aqueous solution of less than 9000 μS/cm over a pH range of 2 to 12; and having a cruciferin/napin (C/N) ratio in the range of from 0.9 to 1.3.

9. A product comprising gluten free native rapeseed protein isolate according to claim 1 as a foaming agent for food products.

10. A product comprising gluten free native rapeseed protein isolate according to claim 1 as an emulsifying agent for food products.

11. A food product comprising a gluten free native rapeseed protein isolate according to claim 1.

* * * * *